UNITED STATES PATENT OFFICE

2,410,286

GLASS HAVING LOW-POWER FACTOR

Harrison P. Hood, Corning, N. Y., assignor to Corning Glass Works, Corning, N. Y., a corporation of New York No Drawing. Application November 12, 1943, Serial No. 510,033

6 Claims. (Cl. 106—54)

This invention relates to glass compositions and more particularly to glasses having characteristics which render them especially suitable for the fabrication of special parts in radio broadcasting and receiving apparatus for use at ultra high frequencies. In such apparatus power losses are of paramount importance and it is essential that the glass have a very low power factor. Moreover, the expansion coefficient must be high enough and the softening temperature low enough to permit successful sealing to other glass and metal parts. The power factor of fused silica glass is very low, but it is very difficult to melt and fabricate and its use necessitates the use of special sealing glasses. Glasses having high silica contents also have correspondingly low power factors, but such glasses are also hard to melt and have low expansion coefficients.

In my prior patent, No. 2,072,207, I have disclosed borosilicate glasses having relatively low power factors. The glasses of the patent contain 80% to 85% of silica and have low alkali contents which are introduced into the glass as sodium fluoride or other fluorine compounds of sodium. With such high silica and low alkali contents the prior glasses have unusually low expansion coefficients and high softening points. Decreasing their silica and increasing their alkali contents not only raises the expansions and lowers the softening points of the glasses, but also is accompanied by a substantial increase in power factor. For example, in composition A of the patent a minimum power factor of .0005 was obtained when the $SiO_2$ was 85% and the alkali content, calculated as $Na_2O$, was 2.2%, the glass then having an expansion coefficient of $22 \times 10^{-7}$ and a softening point of 845° C. However, in composition B the power factor was five-fold greater or .0025 when the $SiO_2$ was lowered to 81.27% and the $Na_2O$ was raised to 4.42%, the expansion then being $31 \times 10^{-7}$ and the softening point 800° C. In the glasses of the patent, therefore, it seems impossible to lower the silica below 80% without too great sacrifice in power factor nor to attain further lowering of the power factor without further sacrifice in expansion coefficient and meltability.

Nevertheless, on account of the need for a better dielectric as an essential requirement for use in the transmission and reception of unusually high frequencies, it is the primary object of this invention to provide a borosilicate glass having an extremely low power factor without the concomitant high melting point and low expansion coefficient of prior glasses.

Another object of this invention is to provide glasses having power factors less than .0007 with silica contents less than 80%, expansion coefficients above $30 \times 10^{-7}$ and softening points below 800° C.

Another object is to provide a glass having a power factor of about .0004 with a silica content of about 70%.

I now have found that the substitution of potassium, in percent by weight wholly or in part for sodium in the prior glasses, has an unexpected depressing effect on the power factor, whereby the silica contents can be decreased to as little as 70% or less and the power factor will not only remain below .0005 but actually can be further lowered to about .0004. Best results are dependent also upon other factors. Sodium, if present, must be added as a fluoride. The substitution of lithium in equal percentages by weight for sodium or potassium raises the power factor regardless of the presence of fluorine. The total alkali content should not exceed about 6% calculated as oxide. I have found that the introduction of alumina into the glass raises the power factor, hence its presence is objectionable. Oxides of the metals of the second periodic group and of lead should preferably be absent because they tend to raise the power factor. The presence of water or water containing compounds such as boric acid, $H_3BO_3$, in the batch apparently tends to increase the power factor when no fluorine is present. The latter is believed to eliminate water as HF and this behavior appears to be more effective in the presence of potassium compounds. Hence crystalline boric oxide, which contains no water, as distinguished from vitreous boric oxide, is preferable as a source of boric oxide when the batch contains no fluoride. Crystalline boric oxide may be prepared by the method disclosed in Patent 2,137,058.

As examples of glasses illustrating my invention, the following batches are given:

Table I

|  | 1 | 2 | 3 | 4 | 5 | 6 | 7 | 8 |
|---|---|---|---|---|---|---|---|---|
| Sand | 350 | 305 | 350 | 350 | 350 | 350 | 350 | 350 |
| $H_3BO_3$ | 212 | 310 |  | 212 |  | 230 | 244 | 235 |
| $K_2CO_3$ (85%) | 53 | 26 |  |  | 32 |  |  | 19 |
| $KNO_3$ |  | 11 | 43 |  | 130 |  |  |  |
| $B_2O_3$ |  |  | 130 |  |  |  |  |  |
| $K_2SiF_6$ |  |  |  | 70 | 10 | 47 | 30 |  |
| $Na_2SiF_6$ |  |  |  |  |  |  |  | 26 |

The compositions of the above batches in weight percentage on the oxide basis and their respective power factors are as follows:

*Table II*

|  | 1 | 2 | 3 | 4 | 5 | 6 | 7 | 8 |
|---|---|---|---|---|---|---|---|---|
| $SiO_2$ | 70 | 61 | 70 | 70 | 70 | 70 | 70 | 70 |
| $B_2O_3$ | 24 | 35 | 26 | 24 | 26 | 26 | 27.5 | 26.5 |
| $K_2O$ | 6 | 4 | 4 | 6 | 4 | 4 | 2.5 | 1.75 |
| $Na_2O$ |  |  |  |  |  |  |  | 1.75 |
| Power factor | .00095 | .0006 | .00055 | .0006 | .00038 | .00033 | .00036 | .00042 |

Batches 4 to 8 contain fluorine which is present in the final glasses although for convenience in calculating the final compositions, it is omitted from Table II.

Considering the above compositions, it will be noted that when the alkali consists of 4% or less of potash, partly or entirely as fluoride, the power factor may be decreased to about .0004 or less, as shown by glasses 5, 6, and 7. In the absence of fluorine and/or with more than 4% $K_2O$ the power factor exceeds .0005 as shown by glasses 1, 2, 3, and 4. The values for power factor were measured by the method known as A. S. T. M. D-150-42T set forth on page 1148 et seq., part III of the A. S. T. M. Standards for 1942.

I claim:

1. The method of reducing the power factor of a borosilicate glass consisting of about 70% $SiO_2$, 26% to 27.5% $B_2O_3$, 2.5% to 4% alkali metal oxide and fluorine, which includes the step of introducing the boron content of the glass as crystalline boric oxide.

2. A batch for a glass having a power factor less than .0005, which consists of sand, a fluorine compound of an alkali metal and a compound of boron, and which amounts on the oxide basis approximately to 70% $SiO_2$, 26% to 27.5% $B_2O_3$ and 2.5% to 4% total alkali metal oxide selected from the class consisting of $Na_2O$ and $K_2O$, and comprising at least $K_2O$.

3. A batch for a glass having a power factor less than .0005, which consists of sand, a compound of boron, a compound of potassium and a fluorine compound of sodium, and which amounts on the oxide basis approximately to 70% $SiO_2$, 26.5% $B_2O_3$, 1.7% $K_2O$, and 1.7% $Na_2O$.

4. A batch for a glass having a power factor less than .0005, which consists of sand, crystalline boric oxide and at least one compound of an alkali metal including a fluorine compound and which amounts on the oxide basis approximately to 70% $SiO_2$, 26% to 27.5% $B_2O_3$, and 2.5% to 4% total alkali metal oxide selected from the class consisting of $Na_2O$ and $K_2O$, and comprising at least $K_2O$.

5. A borosilicate glass having a power factor less than .0005, which consists of approximately 70% $SiO_2$, 26% to 27.5% $B_2O_3$, a small amount of fluorine, and 2.5% to 4% total alkali metal oxides selected from the class consisting of $Na_2O$ and $K_2O$, and comprising at least $K_2O$.

6. A borosilicate glass having a power factor less than .0005 which consists of approximately 70% $SiO_2$, 26.5% $B_2O_3$, 1.7% $K_2O$ and 1.7% $Na_2O$, and a small amount of fluorine.

HARRISON P. HOOD.